United States Patent [19]

Aguilar

[11] Patent Number: 5,353,006
[45] Date of Patent: Oct. 4, 1994

[54] ANTI-THEFT CONTROL TO PREVENT UNAUTHORIZED STARTING OF AN ENGINE

[76] Inventor: Ricardo Aguilar, 5014 Gateway E., El Paso, Tex. 79905

[21] Appl. No.: 929,584

[22] Filed: Aug. 17, 1992

[51] Int. Cl.⁵ .............................................. B60R 25/10
[52] U.S. Cl. .................................. 340/426; 307/10.2; 307/10.3; 180/287; 123/179.3
[58] Field of Search .............................. 307/10.2–10.7; 340/426; 180/287; 123/198 B, 179.3

[56] References Cited

U.S. PATENT DOCUMENTS

| 4,209,709 | 6/1980 | Betton | 307/10.4 |
| 4,232,289 | 11/1980 | Daniel | 340/64 |
| 4,292,541 | 9/1981 | Ambrosius | 307/10.5 |
| 4,533,016 | 8/1985 | Betton | 180/287 |
| 4,733,638 | 3/1988 | Anderson | 123/198 B |
| 5,138,986 | 8/1992 | Aguilar | 307/10.4 |

Primary Examiner—John K. Peng
Assistant Examiner—Tim Johnson
Attorney, Agent, or Firm—John J. Byrne

[57] ABSTRACT

A vehicle anti-theft control which prevents the vehicle from being started by providing a code input authorization system working in combination with an enclosed controller relay system of a solonoid which prevents the starter motor from engaging the engine until after a correct code authorization is received. The controller is housed in an intermediate chamber of a solonoid housing and cannot be circumvented by exterior hot wiring so as to prevent electricity from passing to either the pulling or holding coils of the solonoid.

7 Claims, 6 Drawing Sheets

5,353,006

ANTI-THEFT CONTROL TO PREVENT UNAUTHORIZED STARTING OF AN ENGINE

BACKGROUND OF THE INVENTION

The stealing of automobiles is becoming an increasingly serious problem. The thieves themselves are becoming increasingly sophisticated and are increasingly able to circumvent the efforts of automobile designers.

The prior art is aware of many mechanical and electronic devices to prevent theft. Some, such as my co-pending application, have included code input devices that will prevent the starter engine gear from being driven into mesh with the engine input gear unless the proper code is entered into a bank of relays.

The solenoid that drives the starter motor gear into engagement with the engine input gear is of a two coil variety. This invention interrupts the current in both of these coils unless the proper input code is entered.

This invention relates to a device for use with an internal combustion engine to prevent an unauthorized person from starting the engine. Particularly, this invention utilizes novel practical apparatus and methods of operation including a user-input code to prevent unauthorized starting of an internal combustion engine; and, which does not substantially interfere with authorized use.

SUMMARY OF THE INVENTION

A principle objective of this invention is to provide a novel user-control means to prevent unauthorized starting. The unit requires a user to input an authorization code before the internal combustion engine can start. The invention also includes anti-bypass means to prevent an unauthorized person from bypassing the user-control means, such that, even if the unauthorized person understands the system and has special tools and replacement parts, the engine cannot be started within a practical amount of time.

Another important objective of this invention is to ensure that neither the holding coil or the pulling coil of the solenoid receives current until after the proper input is entered into the keyboard.

A still further objective of this invention is to provide a system that prevents sending sufficient current to one of aforesaid coils which might be sufficient to drive the starting gear.

Another important objective of the invention is to provide a solenoid apparatus which cannot be hot-wired from the exterior thereof, because the essential controller element is located in an intermediate chamber protected from outside tampering.

A BRIEF DESCRIPTION OF THE DRAWINGS

Other advantages and contributions will be understood upon reading the following description in view of the drawings, in which.

DESCRIPTION OF THE PREFERRED EMBODIMENT

Figure 1:
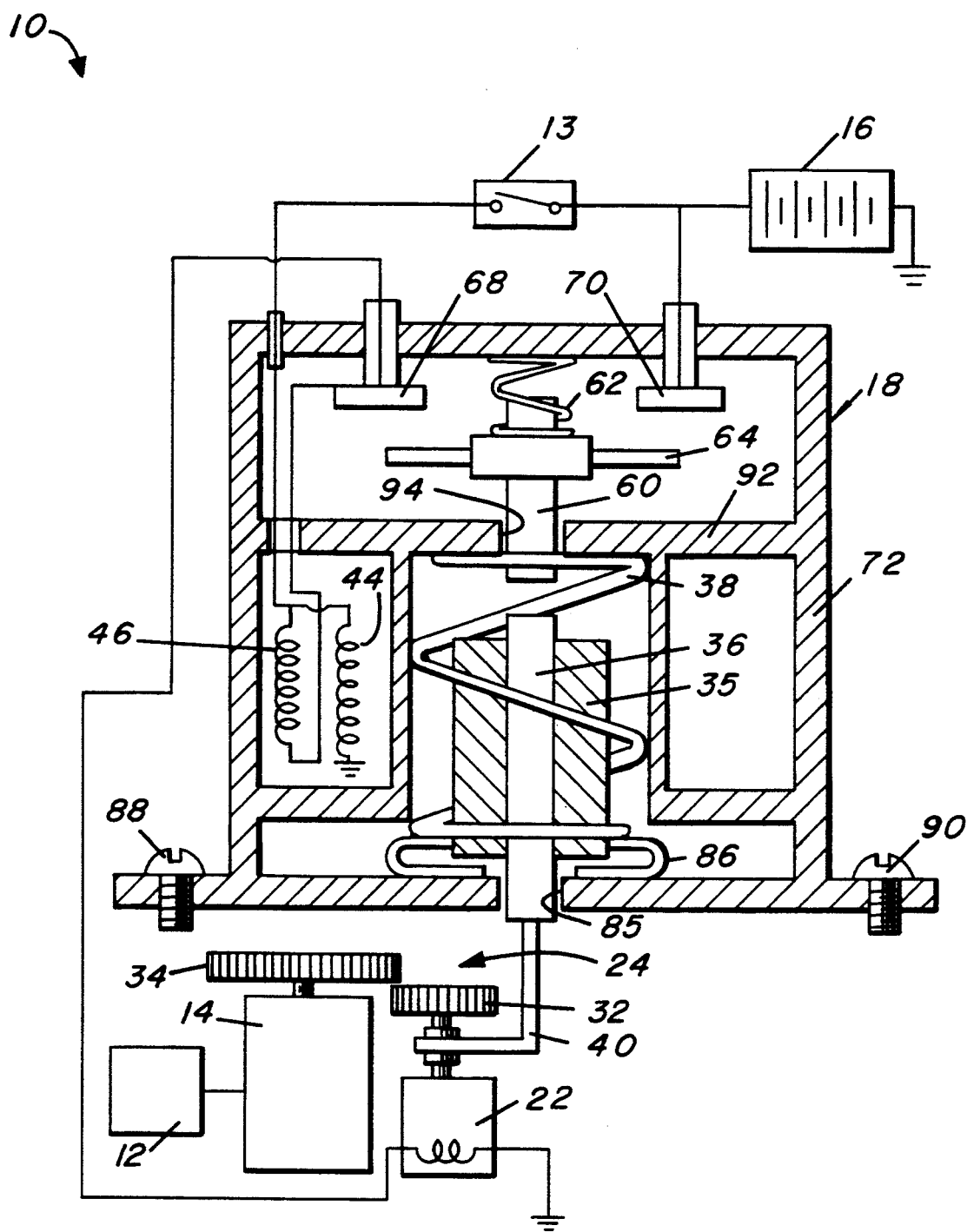
FIG. 1 is a schematic view, partially in cross-section, that illustrates a prior art device.

Referring now to the drawings where like numerals indicate like parts, the prior art device of FIG. 1 is referred to generally by the numeral 10. A source of combustible fluid fuel 12 supplies fuel to an internal combustion engine 14 to convert the fuel into work for the machine. A source of starting energy, such as battery 16, provides power to a starter motor 22 which converts the starting energy to starting work.

The battery 16 is connected to a solenoid component 18 to control the flow of electricity to starter motor 22. Battery 16 is also connected to the solenoid component 18 to regulate the flow of electricity to energize engagement gear 24 which transfers starting-work from starter motor 22 to engine 14. The starter motor 22 raises the speed of the engine to a minimum self-sustaining speed. Battery 16 also supplies control energy for the solenoid component 18 which contains switching that is connected through the ignition switch 13. When the user turns the switch in a first direction, a starting sequence is initiated, and upon release, the switch springs back in an opposite second direction to terminate the starting sequence.

The engagement means 24 includes an input gear 32 driven by starter motor 22. The gear 32 is moveable to a position in mesh with a gear 34 that drives engine 14. This transfers starting work from the starter motor 22 to the engine 14. The gear 32 is moved into a the start position, where the two gears 32 and 34 mesh, to transfer starting work produced by the starter motor 22 to the engine 14 for starting the engine. The gear 32 is normally in the disengaged position as shown in FIG. 1.

If gears 32 and 34 are moved together while the starter motor is operating, the gears may be damaged. Therefore, a control switch is provided in the solenoid component. The solenoid prevents flow of electricity to starter motor 22 until after completion of gear engagement. A spring 38 generates a force preventing the switch from moving into position-for-starting until coils 42 and 44 are energized. The switching is comprised primarily of conducting washer 64 and contacts 68 and 70. Contact is made only after a sufficient magnetic field strength for the plunger 36 is developed sufficient to overcome the bias of spring 38. Force and movement are transferred to gear 32 by linkage arm 40 as plunger 36 moves upwardly.

The user initiates the starting sequence by activating ignition switch 13. This energizes the holding coil 42 and the pulling coil 44. A magnetic field is generated that moves the engagement core 35 of the engagement plunger 36. As plunger 36 is raised, it moves the gear 32 into mesh with gear 34 through linkage 40. Thereafter, further movement causes the plunger 36 to move the rod 60 against the force of spring 62. This moves rod 60 into a position where conductor washer 64, mounted on switch rod 60 by insulator 66, contacts starter contacts 68 and 70. This completes the circuit to starter motor 12 so that gear 32 is rotated.

Once the starting position is achieved, pulling coil 42 is de-energized to reduce starting energy requirements and the holding coil 44 remains energized until starter switch 13 is released.

The solenoid assembly is enclosed by a shell 72 that protects the components of the solenoid from external environmental hazards such as water, dirt, oil, rocks, loose wires, falling tools that might damage or prevent movement of the enclosed components. A flexible diaphragm 86 prevents contaminants from entering the solenoid component through the aperture 85 through which the engagement linkage 40 extends. The shell 72 connected to the starter-motor by stove-bolts 88 and 90. A wall 92 separates the solenoid component into two chambers. The lower chamber (as viewed in the drawing) contains the coils 42 and 44 and the engagement plunger 36. Throughout the specification and claims, the terms lower and upper are used as a matter of convenience. Solenoids are oftentimes disposed horizontally. The upper chamber contains the washer conductor 64 and starter contacts 68 and 70. The wall 92 is formed with an opening 94 to provide a bearing to provide axial stability to rod 60.

Figure 2:
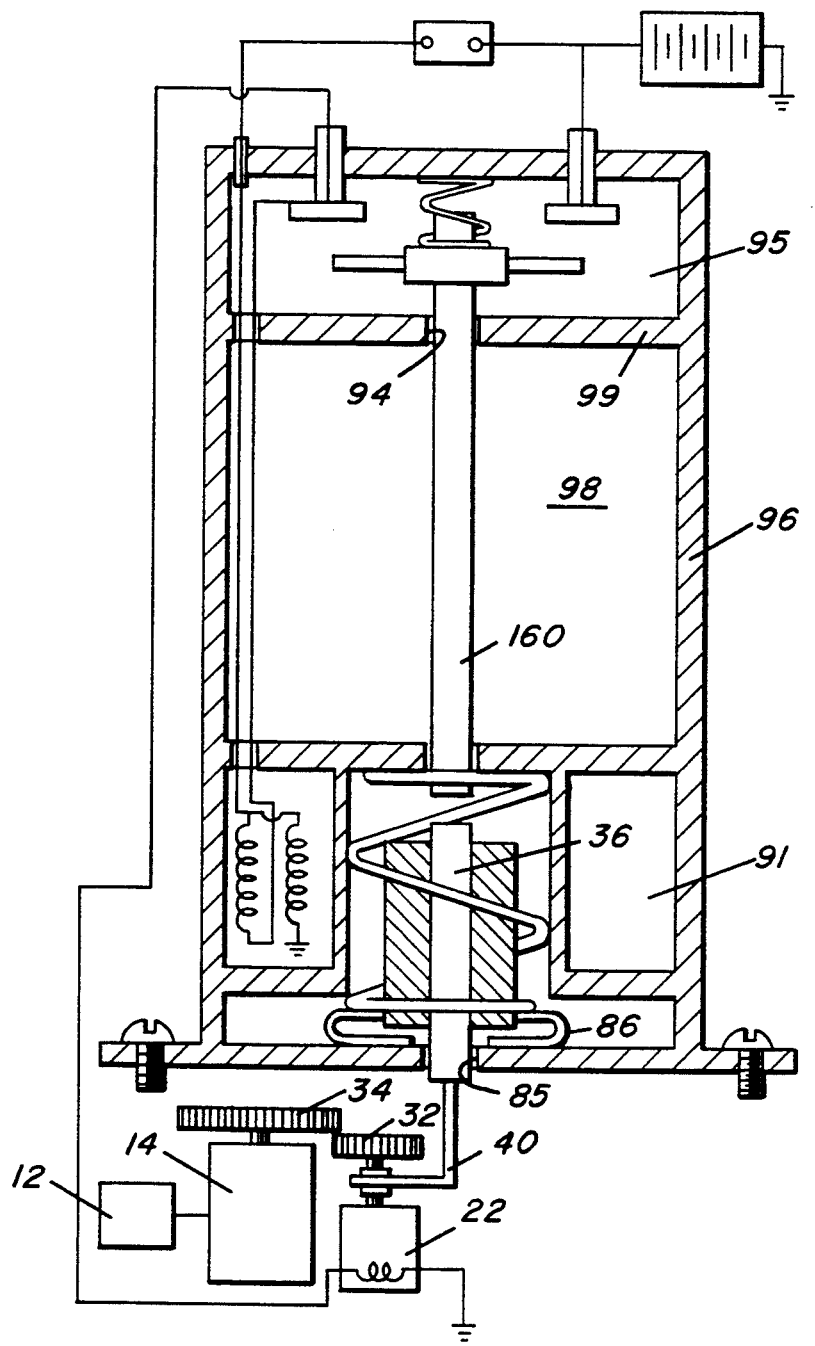
FIG. 2 is a schematic partially in cross-section of an intermediate stage of production for purposes of illustration.

FIG. 2 illustrates the prior art design of FIG. 1 except that it includes an elongated shell or housing 96 to provide an intermediate or third chamber 98 for receiving and protecting the essential components of this invention. The chamber 98 has been formed by the addition of wall 99. The first or lower chamber 91 and the second or upper chamber 95 remain as seen in FIG. 1. Rod 60, however, is elongated so that it will extend into the first chamber. The elongated rod is referred to as rod 160.

Figures 3A, 3B:
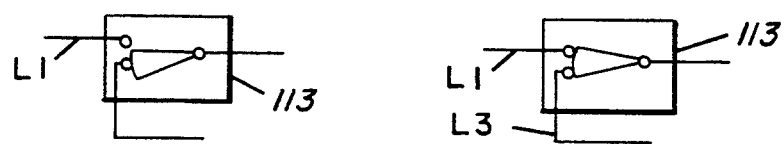
FIGS. 3A and 3B are diagrammatic views of positions of the ignition switch FIG. 3.
Figure 3:
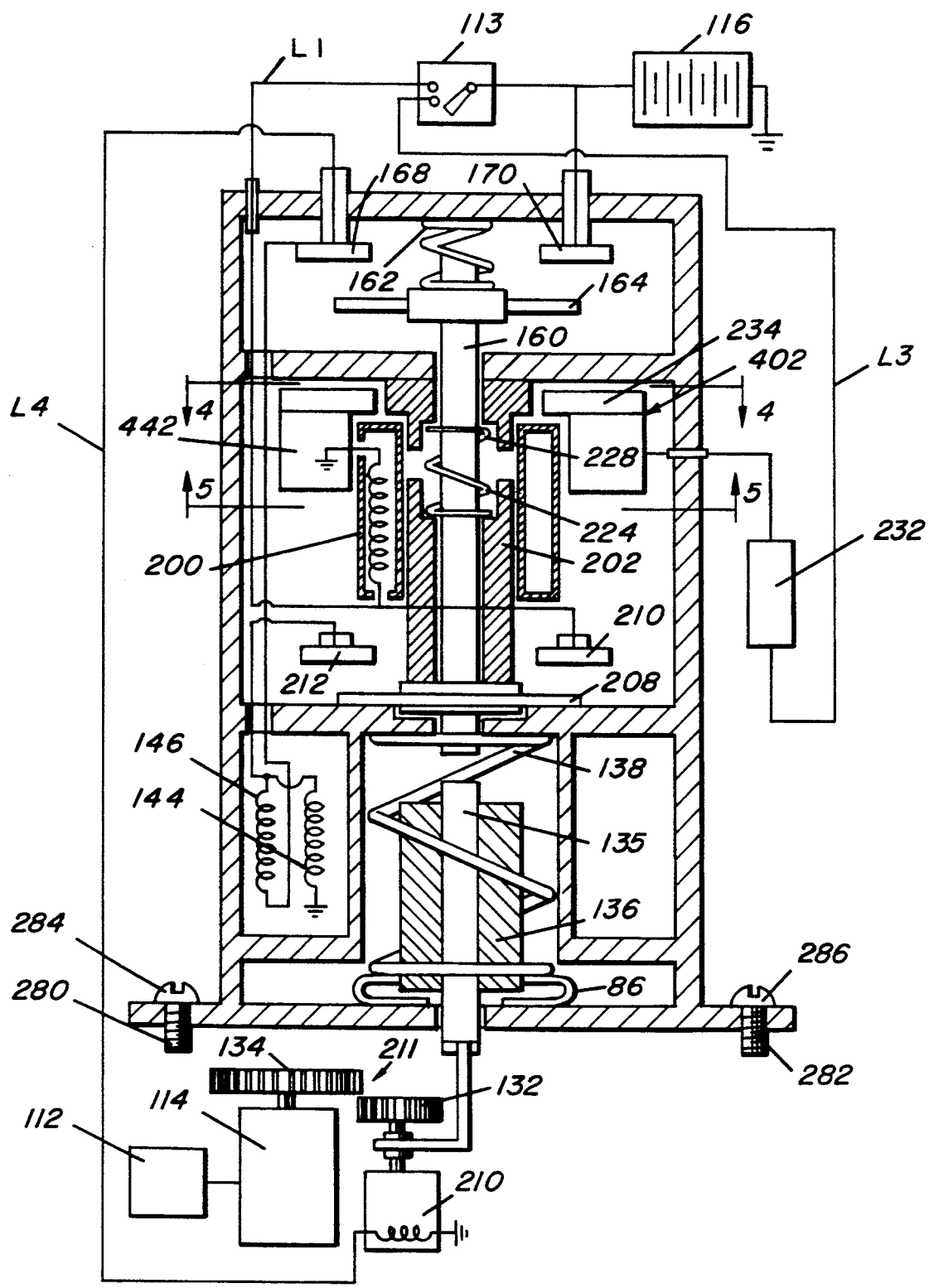
FIG. 3 is a diagrammatic-schematic, partially in cross-section, of a preferred embodiment.

A preferred embodiment of the invention is shown in FIG. 3. A source of combustible fluid fuel 112 is connected to an internal combustion engine 114. The starter motor and the interengaging gears are the same as that shown in FIG. 1. A battery 116 provides a source of energy for the engagement, control, and starting. It can be seen that the intermediate chamber 98 houses the essential components of this invention. The ignition switch 113 is a three position switch. This is the common and ordinary ignition switch supplied by automobile manufacturers. In FIG. 3, the ignition switch is in its "off" position. In FIG. 3A, an intermediate position is shown and in FIG. 3B, the full double contact position is shown.

As shown in my co-pending application, a keyboard input panel 232 is provided. The panel is provided with energy when the ignition switch is moved to the position shown in FIG. 3A. In other of the drawings submitted with this application (e.g. FIG. 8), the position of the switch in FIG. 3A is identified by numeral 236 and the position in 3B is identified by the numeral 238. This is done for clarification.

Figure 6:
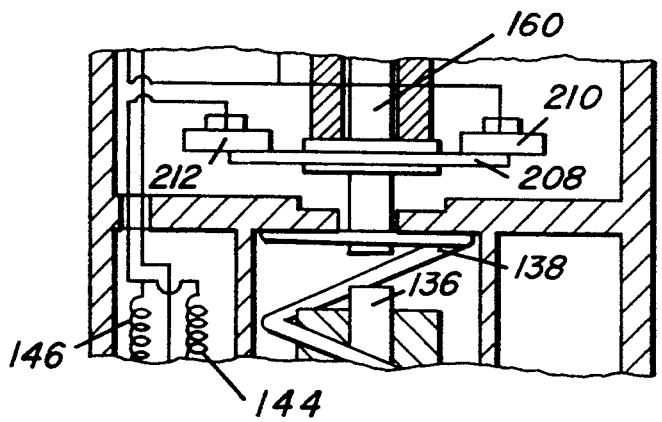
FIG. 6 is a partial view of FIG. 3 showing the movement of one connector component.

Note that rod 160 is an elongated version of the "prior art" rod 60. Rod 60 extends through chamber 98. A control coil 200 is disposed about rod 160. When control coil 200 receives current it will cause core 202 to move upwardly against the bias of spring 224. As seen in FIG. 6, this movement carries conductor washer 208 against contacts 210 and 212. At this time, rod 160 remains stationary. Since power is available at contact 210 through line L1, coils 144 and 146 are energized. This causes core member 136 to move upwardly against the bias of spring 138 until gear 32 moves into mesh with gear 34. This movement continues until the upper end of rod 135 engages the lower end of rod 160 and pushes it upwardly against the bias of spring 162 until washer 164 is carried into engagement with contacts 168 and 170. This establishes a connection to line L4 so as to rotate gear 132 which has already been driven home (in mesh with 134) prior to the establishment of the L4 connection. In other words, the dimensions of the components and circuitry are such that drive gear 132 is driven into mesh with gear 134 prior to conductor washer 164 connecting terminals 168 and 170.

Code input means 232 comprises a typical keyboard containing multiple push button, momentary contact, input switches to allow sequential entry of an authorization code by the user. The code input means are connected to a controller 402 for user input of an authorization code. As explained hereinafter the controller 402 is a plastic disc in the intermediate chamber that has circuitry on one surface (FIG. 4) and a plurality of relay switches on its reverse surface (FIG. 5). Code signals that match predefined authorization code requirements must be received by the circuit board controller 402 before it will generate control signals to enable the engine to start. The controller 402 regulates the flow of electricity to starter motor 210 and engagement means 211.

When code signals that comply with pre-defined authorization code requirements have been received by the circuit board means 235, on the upper surface 403 of controller 402 the user can initiate further starting sequences by moving starter switch 113 to the FIG. 3B position.

The enclosing shell 96 of the invention is connected to a motor housing or framework by using one-way fasteners 280 and 282 to prevent replacing the enclosing-component of the invention with a conventional component thus preventing an unauthorized person from bypassing the use control means by such replacement. The fasteners have one-way heads 284, 286 at the front end of the bolts which enable installation from the front end using hand tools, but which prevent removal from the front end without drilling or grinding.

In a specific embodiment, the fasteners are one-way stove bolts with one-way heads that can be installed using the blade of a screwdriver, and the back ends have hex-shaped tips to enable attachment with a crescent wrench. Alternatively, the back ends can be configured with a hex-shaped hole for attachment with an allen wrench. The solenoid component is mounted on the starter motor and the starter motor must be removed from the engine to access the back ends of the bolts. This is described in my co-pending application.

The positions of ignition switch 113 are sometimes shown separately as source switch 236 and or starter switch 238. But, as mentioned previously, they are commonly a single switch having the positions shown in FIGS. 3, 3A, and 3B.

The use control means consists essentially of the keyboard 232, a connecting cable, the solenoid component and the switching controller 402.

Figure 4:
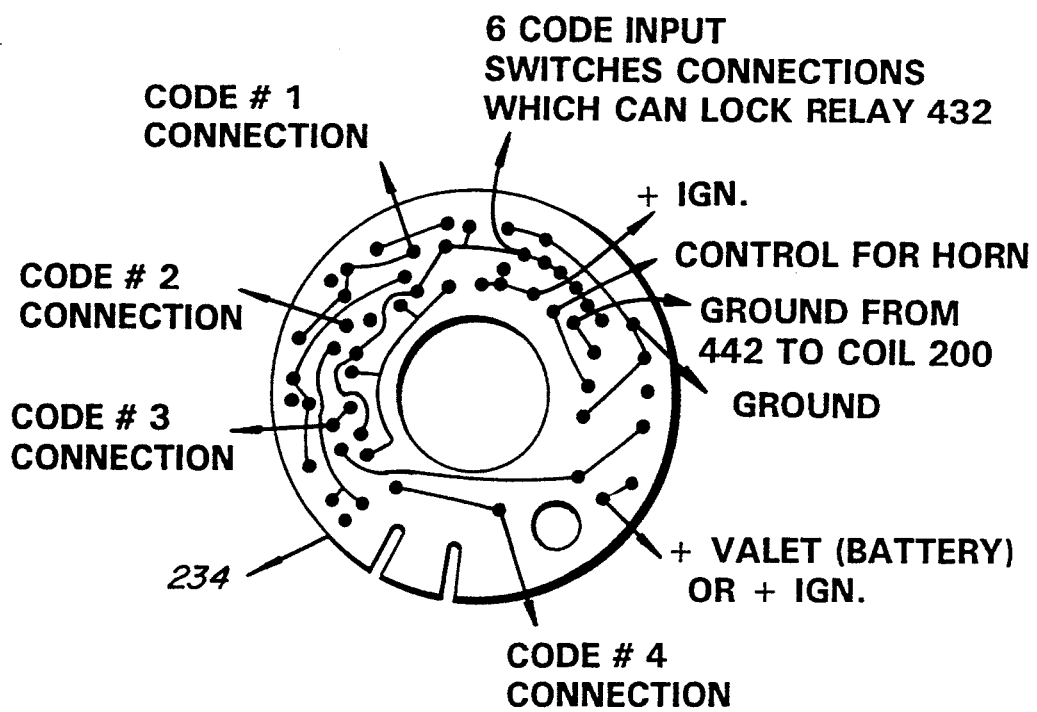
FIG. 4 is a horizontal cross-section along the line 4—4 of FIG. 3.
Figure 5:
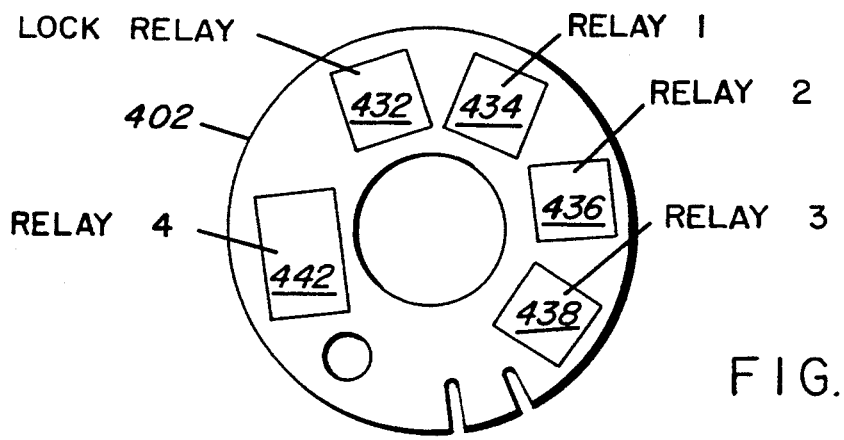
FIG. 5 is a horizontal cross-section along the line 5—5 of FIG. 3.
Figure 8:
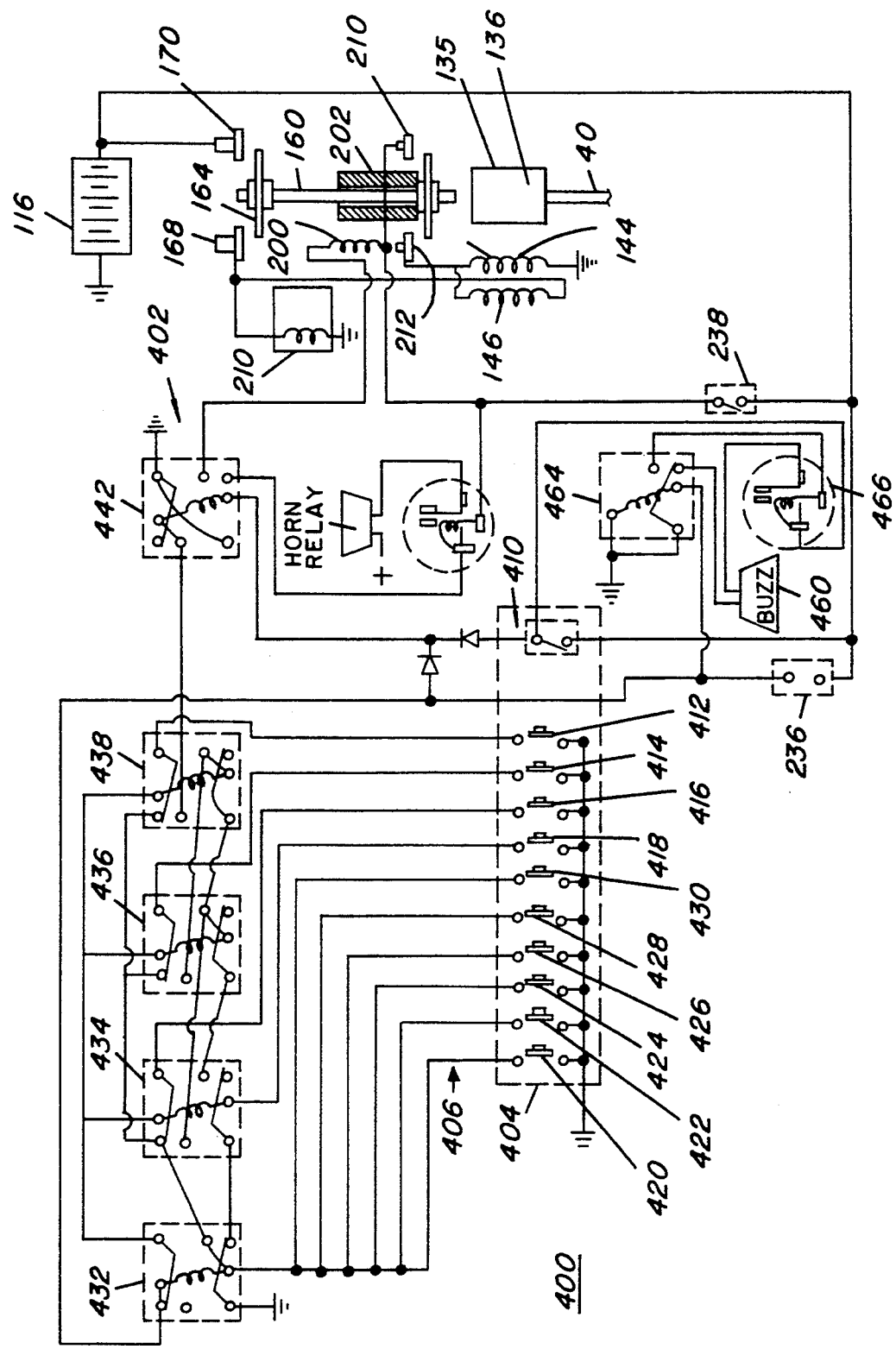
FIG. 8 is an electrical schematic illustrating the circuits.

The physical representation of the controller 402 is best seen in FIGS. 4 and 5. The controller consists of a plastic disc 403 having the board circuitry 405 formed on its upper surface. Suspended from the lower surface of disc 403 are the relay switches 432, 434, 436, 438, and the lockout switch 442. The actual circuitry is best seen in FIG. 8. Relay 432 is a lock relay. This relay is activated to lock the controller if the input code is incorrect or entered out of sequence. Relay 434 is the relay for the first code number in the sequence and corresponds to code input switch 418. Relay 436 is the second code number in the sequence and corresponds to code input switch 416. Relay 438 is the third code number in the sequence and corresponds to code input switch 414. Relay 442 represents the fourth code number in the sequence and corresponds to code input switch 412. Relay 442 has two further functions; namely, it provides the ground 441 for coil 200. Thus, when the starter switch is in the position of FIG. 3B, and passes current through L1, coil 200 is energized. In addition, relay 442 is also the valet relay. When relay 442 is energized by the ignition switch, it can be de-energized by turning the ignition switch to its "off" position. However, when relay 442 is energized by the switch and the valet switch 410 is activated, relay 442 will continue to be energized even when the ignition switch is off. Therefor, relay 442 is part of the valet system.

A skilled mechanic can install the use-control means of the invention in a few minutes. If a component of the use control means fails and replacement parts are not available, the solenoid component can be temporarily replaced by a conventional solenoid component. However, replacing the solenoid component of the invention requires removal of the starting motor, removal of the solenoid reinstalling the starter-motor, and installing a new solenoid component. This requires about an hour for a skilled mechanic with a lift and conventional tools of his trade. This is too time consuming for a thief.

The shielded enclosure 96 has general utility for protecting enclosed parts such as mechanical and electrical components. The enclosing shell is a sealed metal container to protect enclosed components from external environmental hazards such as water, dirt, oil, rocks, loose wires, falling tools. The enclosing shell 96 is constructed with welded or mechanical connections so that the solenoid component cannot be disassembled or the enclosed parts manipulated without damaging the functioning of the solenoid component. The shielded enclosure provides a tamper-proof device that prevents manipulation of the enclosed parts by unauthorized persons.

It is not feasible to bypass the use control means because manipulation of the engagement means is prevented. The enclosed components of the use control means have been selected such that there are no external connections which can be energized to move the engager into position-for-starting. No method of rewiring or disabling the individual components can be used to bypass the use control system. The solenoid component is attached to the starter motor. Thus, the main control for the engagement means are physically enclosed within the solenoid housing. An unauthorized person will not have the time, tools, and skill required to remove the starter motor, remove the solenoid component, replace with a conventional solenoid, and replace the starter motor.

Furthermore, it is not feasible to guess the authorization code. There are too many combinations. For a four or five digit authorization code an average of thousands of guesses would be required in order to input the proper code.

Figure 7:
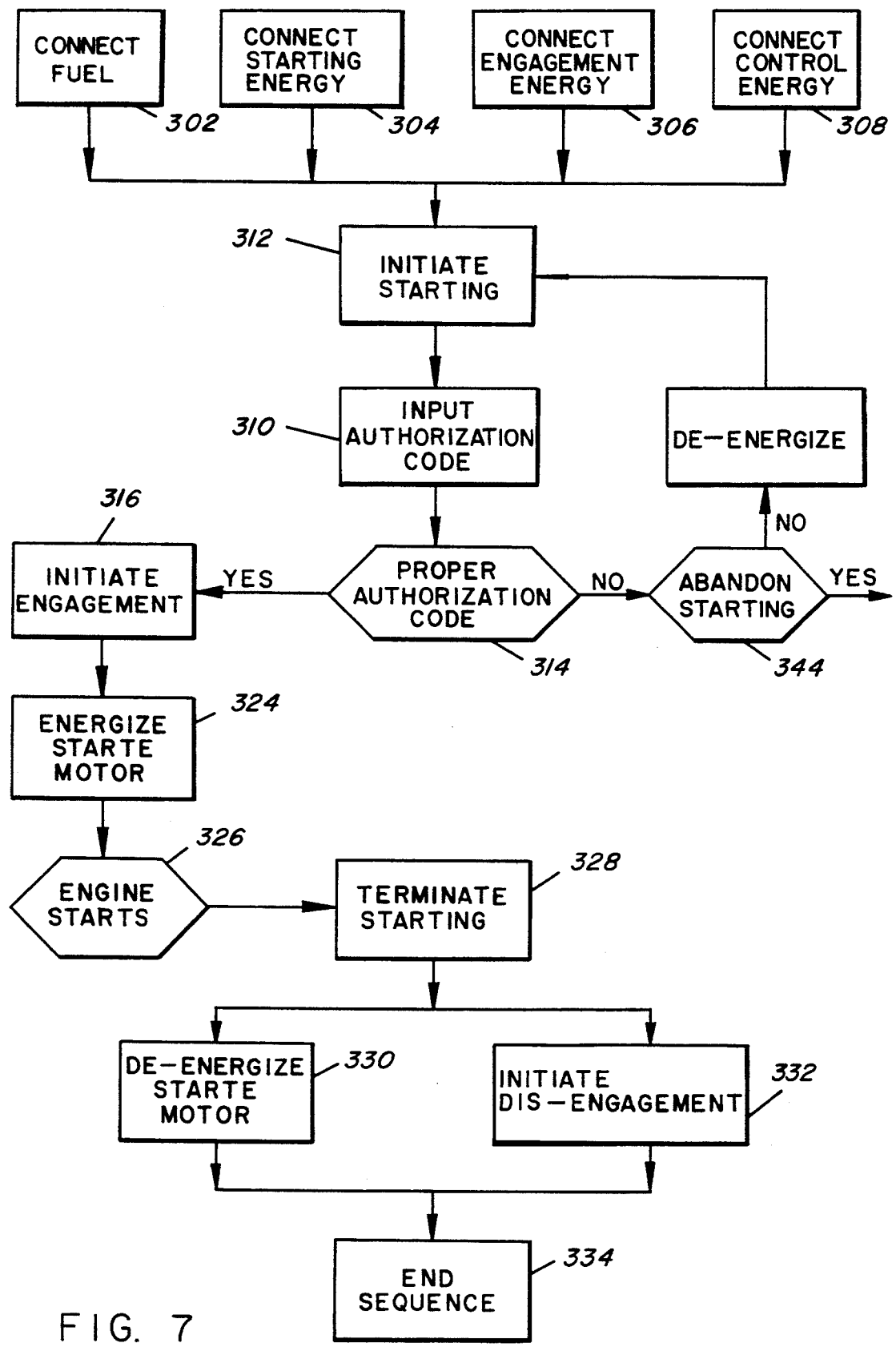
FIG. 7 is a block diagram presenting the operation of the invention.

A flow diagram of the system is shown in FIG. 7. This diagram illustrates that the engine is connected to a source of combustible fluid fuel 302, a source of starting energy 304, a source of engagement energy 306, and a source of control energy 308. After control energy is connected the user inputs an authorization code into a code input means which transmits code signals to a controller which determines whether code signals comply with pre-defined authorization code requirements, and generates control-signals that enable starting only if such requirements are met. Then the user can move the ignition switch to that shown in FIG. 3B.

The code input means is a keyboard containing multiple momentary contact, push button, code input switches or it could be a single code-input switch for inputting an authorization code in the form of timed pulses. The starting sequence can be initiated by imputing the correct sequence of numbers.

When the controller 402 determines that the authorization code requirements are met at code reader 314, and the user has initiated starting, then the controller initiates engagement 316 between the starter-motor 210 and engine 204. After engagement the starting sequence is complete. Otherwise, if the controller determines that authorization code requirements are not met, engagement is not initiated and the engine will not start because coils have received no current.

When the engine starts, the ignition process is terminated either automatically or by user input. The controller de-energizes the starter motor 330 and initiates disengagement 332 of the starter motor from the engine and the ignition sequence ends.

The preferred embodiment of use control circuit 400 is shown in FIG. 8. The control circuit includes the controller 402 located within the shielded enclosure of the solenoid component. The user input means includes a source switch 236 connecting the source of control energy 206 to circuit board 402. The keyboard 400 is connected by a cable of wires 406 to the relays of controller or circuit board 402.

Keyboard 404 includes a valet switch 410, and ten code input switches. Four of the code input switches 412, 414, 416, and 418 are combination switches that must be pressed in correct sequential order to transmit the authorization code before the engine will start. Pushing any other code input switch 420, 422, 424, 426, 428, 430 that is not part of the authorized code locks the controller; as does pushing any combination switch out of correct sequential order. The number of code input switches can be varied, but a sufficient number of combination switches must be provided such that guessing the authorization code is not feasible. Cable 406 includes one wire for each code input switch, and one wire for each valet switch 410.

The controller 402 consists essentially of four control relays connected to perform required control functions. These include a lock relay 432 and four combination relays 434, 436, 438, and acts as port of a valet system 442, if desired. Each combination switch 412, 414, 416, 418 of keyboard 404 is connected to one combination relay, and each combination relay is connected to one combination switch, such that the combination switches have to be activated to set the control relays in correct sequential order or the lock relay is activated (set) to lock the controller. Activating lock relay 432 locks the controller so that the controller will not accept an authorization code. When switch 236 is "off" this clears the lock relay so that the controller will permit authorization code entry when the supply switch is reactivated. After starting, the combination relays may be cleared without affecting the operation of the machine.

Valet switch 410 is connected to valet relay 442. The valet switch activates the valet relay 442 only if all the combination relays are activated. The valet switch is separately connected to battery 206 such that once activated, the valet relay remains activated until the valet switch is turned off, regardless of source switch 236 cycles or code input switch activations. Thus, after a proper authorization code has been entered the valet switch can be used to deactivate the use control means to allow another person to temporarily use the vehicle without revealing the authorization code to such person. Thus the need to change the authorization code after each temporary use is eliminated. Thus, one can give the vehicle to a parking attendant or a valet and the attendant can re-start the engine without being informed of the code sequence.

When all of the combination relays are activated, or when the valet relay is activated, the controller outputs an enablement signal which is an "On" signal which permits the engine to start. Otherwise, the controller will output a default signal which is an "Off" signal which prevents the engine from starting.

Whenever the controller is de-energized and the valet relay is not activated, and the source switch is activated to the controller, then the controller begins to operate in a clear state in which the relays are clear. Whenever the controller is operating in a clear state, it outputs a default signal to the power regulator which is an "Off" signal in which no current flows. Whenever the controller is operating in a clear state and a combination switch is activated in the correct sequential order, then the controller begins to operate in an input state and continues to output a default signal. Whenever the controller is operating in an input state and the correct number of combination switches are activated in the correct sequential order, the controller will begin to operate in an authorized state. In this state the controller outputs an enabling signal to the coil which is an "On". Whenever the controller is operating in a permission state and the valet switch is turned on and the valet relay set, the valet function is activated, and the controller will continue to operate in an enabling state regardless of changes in the source switch or code switch activations. This state remains until the valet switch is turned off. Whenever the valet function is activated, the controller will output an enablement signal when the starter switch is activated. Whenever the controller is operating in an input state or a clear state and a code input switch is activated by an incorrect sequential combination, then the controller will operate in a locked state. The controller will not accept authorization code input, or output an enablement signal until the supply switch is deactivated and reactivated which results in clear-state operation.

Clear relay 432, valet relay 442, and combination relays 434, 436, 438, are double-pole, double-throw miniature relays such as MAGNECRAFT W7PCK7's.

The use of a valet switch and a valet relay is an important contribution of the invention but they may be eliminated to reduce cost without interfering with operations.

Advantages of the preferred use control circuit eliminates the need for delicate electronic parts (parts which would not be sufficiently reliable for commercial purposes within the environment of the circuit and shielded enclosure such as integrated circuits or transistors) are not required. When the valet function has been activated and source switch 236 is off only the valet relay remains active requiring only about one watt of power.

In FIG. 8, there has been blended into the circuitry certain electronic warning devices such as a buzzer connected to relay 464 and/or a horn 465 connected across relay 442. These alarms enhance the system in some circumstances.

As noted above, my copending application Ser. No. 07/500,548, now U.S. Pat. No. 5,138,986 is also a valuable means to discourage theft. The specification and drawing in that application are incorporated herein by reference.

While the invention has been particularly illustrated and described with reference to preferred embodiments, it will be understood by those skilled in the art that changes in form and detail can depart from such embodiment without departing from the spirit and scope of the invention.

I claim:

1. A vehicular anti-theft device of a type to prevent the starting of a vehicle's internal combustion engine, comprising:
   a first gear connected to said engine for receiving a rotative movement to start said engine;
   a starter motor;
   a second gear extending from said starter motor having a first position not in engagement with said first gear and a second position in engagement with said first gear;
   a source of power;
   a first electrical conduit leading from said source;
   an ignition switch having an off position, a one-contact position and a two contact position;
   a housing having a first chamber, a second chamber and a third chamber intermediate said first and second chambers;
   a first switch in said intermediate chamber having an open position and a closed position;
   a second switch in said second chamber having an open position and closed position;
   a first solenoid means in said first chamber comprised of a push coil and a hold coil about a core plunger;
   a second solenoid means having a control coil and a movable core located in said intermediate chamber which when said coil in energized will close said first switch to communicate power from said source to said pull and hold coils;
   a controller means having accept and default modes;
   keyboard means to enter an authorization code into said controller;
   first means to accept or reject said authorization code and place said controller respectively in said accept mode or said default mode;
   a second electrical conduit means communicating power from said source to said keyboard means when said ignition switch is moved to said one-contact position;
   second means responsive to said accept mode to energize said first solenoid and close said first switch so as to communicate power to said second solenoid means causing movement in said core plunger;
   third means responsive to said movement of said core plunger to sequentially move said first gear into said second position and to energize said starter motor upon moving said ignition switch to said third position.

2. The device of claim 1 wherein said first electrical conduit extends between said source and said push and hold coils.

3. The device of claim 2 wherein said second electrical conduit extends between said keyboard and said controller.

4. The device of claim 1 wherein said keyboard means is comprised of a series of buttons.

5. The device of claim 1 wherein said first means is a series of relay switches that activate a lock out relay.

6. The device of claim 1 wherein said first switch includes a pair of contacts located in said intermediate chamber and said core carries a conducting member for connecting said contacts.

7. The device of claim 1 wherein said device includes a lock-out relay and said controller includes at least three serially connected input relays that control said lock-out relay.

* * * * *